(12) United States Patent
Gheorghian et al.

(10) Patent No.: US 10,034,516 B2
(45) Date of Patent: Jul. 31, 2018

(54) FOOTWEAR SOLE STRUCTURE

(71) Applicant: NIKE, Inc., Beaverton, OR (US)

(72) Inventors: Petre Gheorghian, Portland, OR (US); Lalit Monteiro, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/434,856

(22) Filed: Feb. 16, 2017

(65) Prior Publication Data

US 2017/0231322 A1 Aug. 17, 2017

Related U.S. Application Data

(63) Continuation of application No. 15/044,629, filed on Feb. 16, 2016.

(Continued)

(51) Int. Cl.
| | |
|---|---|
| F16F 1/36 | (2006.01) |
| A43B 13/18 | (2006.01) |
| A43B 13/04 | (2006.01) |
| A43B 13/12 | (2006.01) |
| B29D 35/12 | (2010.01) |
| B33Y 10/00 | (2015.01) |
| B33Y 80/00 | (2015.01) |

(52) U.S. Cl.
CPC ............ *A43B 13/186* (2013.01); *A43B 13/04* (2013.01); *A43B 13/125* (2013.01); *A43B 13/188* (2013.01); *B29D 35/122* (2013.01); *B33Y 10/00* (2014.12); *B33Y 80/00* (2014.12); *F16F 1/36* (2013.01); *F16F 2224/025* (2013.01); *F16F 2226/00* (2013.01)

(58) Field of Classification Search
CPC . F16F 1/36; F16F 13/14; F16F 1/3732; A43B 13/188; A43B 13/186; A43B 13/141
USPC ............................ 267/140, 140.12, 144, 145
See application file for complete search history.

(56) References Cited

U.S. PATENT DOCUMENTS

| | | | |
|---|---|---|---|
| 4,535,553 A | 8/1985 | Derderian et al. | |
| 5,022,168 A * | 6/1991 | Jeppson, III | A43B 13/383 36/30 R |

(Continued)

FOREIGN PATENT DOCUMENTS

| | | |
|---|---|---|
| CN | 203087740 U | 7/2013 |
| CN | 203762404 U | 8/2014 |
| WO | 9922160 A1 | 5/1999 |

OTHER PUBLICATIONS

International Search Report and Written Opinion dated Jun. 14, 2017 in International Application No. PCT/US2017/018143, 13 pages.

(Continued)

*Primary Examiner* — Thomas J Williams
*Assistant Examiner* — James K Hsiao
(74) *Attorney, Agent, or Firm* — Shook, Hardy and Bacon LLP

(57) ABSTRACT

A sole structure for an article of footwear includes an impact-attenuation support member. The impact-attenuation support member includes a first impact-attenuation element and a second-impact-attenuation element. The first and second impact-attenuation elements include one or more portions that are interlinked and that are movable with respect to one another in at least one direction.

20 Claims, 6 Drawing Sheets

Related U.S. Application Data

(60) Provisional application No. 62/299,843, filed on Feb. 25, 2016.

(56) References Cited

U.S. PATENT DOCUMENTS

| | | | |
|---|---|---|---|
| 5,086,574 A | 2/1992 | Bacchiocchi | |
| 5,337,492 A | 8/1994 | Anderie | |
| 5,343,639 A | 9/1994 | Kilgore et al. | |
| 5,353,523 A | 10/1994 | Kilgore et al. | |
| 5,588,165 A * | 12/1996 | Fromme | A47C 23/002 |
| | | | 267/106 |
| 5,785,303 A | 7/1998 | Kutschi | |
| 6,385,864 B1 | 5/2002 | Sell, Jr. et al. | |
| 6,457,261 B1 | 10/2002 | Crary | |
| 6,669,184 B2 * | 12/2003 | Cai | F16F 1/328 |
| | | | 267/162 |
| 6,749,187 B2 | 6/2004 | Yang | |
| 6,763,611 B1 * | 7/2004 | Fusco | A43B 13/125 |
| | | | 36/25 R |
| 6,880,267 B2 | 4/2005 | Smaldone et al. | |
| 6,898,870 B1 | 5/2005 | Rohde | |
| 7,100,309 B2 | 9/2006 | Smith et al. | |
| 7,314,125 B2 * | 1/2008 | Smaldone | A43B 13/183 |
| | | | 188/372 |
| 7,458,172 B2 * | 12/2008 | Aveni | A43B 13/183 |
| | | | 267/144 |
| 7,574,817 B2 | 8/2009 | Fechter | |
| 7,685,742 B2 | 3/2010 | Aveni et al. | |
| 7,707,743 B2 * | 5/2010 | Schindler | A43B 1/0009 |
| | | | 36/25 R |
| 7,730,635 B2 | 6/2010 | Aveni et al. | |
| 7,748,141 B2 | 7/2010 | Smith et al. | |
| 7,757,410 B2 | 7/2010 | Aveni et al. | |
| 7,877,898 B2 | 2/2011 | Aveni et al. | |
| 8,087,187 B2 * | 1/2012 | Aveni | A43B 13/189 |
| | | | 36/28 |
| 8,122,615 B2 | 2/2012 | Lucas et al. | |
| 9,097,308 B2 * | 8/2015 | Lobry | A47C 23/002 |
| D789,060 S * | 6/2017 | Guyan | D2/961 |
| 2001/0049888 A1 | 12/2001 | Krafsur et al. | |
| 2002/0163114 A1 * | 11/2002 | Lobry | B60K 5/1208 |
| | | | 267/140.13 |
| 2005/0005472 A1 | 1/2005 | Perenich | |
| 2006/0283047 A1 | 12/2006 | Schoenborn et al. | |
| 2009/0126225 A1 * | 5/2009 | Jarvis | A43B 13/41 |
| | | | 36/29 |
| 2014/0109441 A1 * | 4/2014 | McDowell | A43B 7/085 |
| | | | 36/103 |
| 2015/0044429 A1 * | 2/2015 | Haimoff | B29D 28/00 |
| | | | 428/175 |
| 2017/0188659 A1 * | 7/2017 | Elder | A43B 13/141 |

OTHER PUBLICATIONS

"About Nike Free Running Shoes" Dec. 20, 2010 skystie.livejournal.com http://skystie.livejournal.com/8496.html Discloses shoe with columnar support cushion in the sole.

"Nike Air Max 90 LE July Releases" Jul. 17th—Posted by King Cobra unlocked.footlocker.com http://unlocked.footlocker.com/blog/2012/07/17/nike-air-max-90-le-july-releases/ Discloses shoe with columnar support cushion in the sole.

"Classics Revisited: Nike Shox VC (2002)" Oct. 8, 2012 by John Kim sneakernews.com http://sneakernews.com/2012/10/.08/classics-revisited-nike-shox-vc-2002/ Discloses shoe with columnar support cushion in the sole.

* cited by examiner

FOOTWEAR SOLE STRUCTURE

CROSS-REFERENCE TO RELATED APPLICATIONS

This application, entitled "Footwear Sole Structure," claims the benefit of U.S. Non-Provisional application Ser. No. 15/044,629, entitled "Footwear Sole Structure," filed Feb. 16, 2016, and U.S. Provisional Application No. 62/299,843, entitled "Footwear Sole Structure," filed Feb. 25, 2016. The entirety of the aforementioned applications are incorporated by reference herein.

BACKGROUND

Footwear articles often include sole structures that provide various functions. For instance, a sole structure generally protects a wearer's foot from environmental elements and from a ground surface. In addition, a sole structure may attenuate an impact or a force caused by a ground surface or other footwear-contacting surfaces. Further, some sole structures may provide a responsive force against a footwear-contacting surface.

BRIEF DESCRIPTION OF THE DRAWINGS

This technology is described in detail herein with reference to the attached drawing figures, which are incorporated herein by reference, wherein.

DETAILED DESCRIPTION

Subject matter is described throughout this Specification in detail and with specificity in order to meet statutory requirements. But the aspects described throughout this Specification are intended to be illustrative rather than restrictive, and the description itself is not intended necessarily to limit the scope of the claims. Rather, the claimed subject matter might be practiced in other ways to include different elements or combinations of elements that are similar to the ones described in this Specification and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

Overview of Some Aspects of the Disclosure

Figure 1:
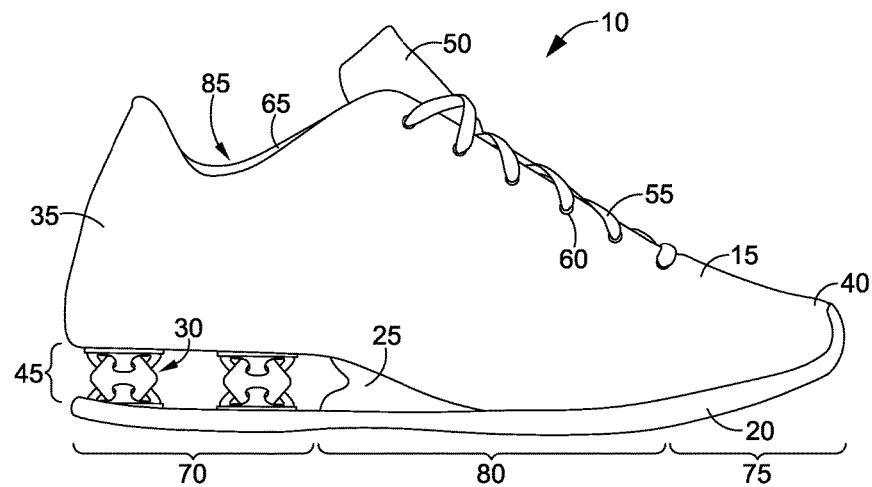
FIG. 1 depicts a side view of an article of footwear in accordance with an aspect hereof.

The subject matter described in this Specification generally relates to a sole structure for an article of footwear. Among other features, the sole structure includes one or more impact-attenuation support members configured to dampen and attenuate an impact force exerted on the sole structure. For example, an exemplary article of footwear 10 is depicted in FIG. 1, the footwear 10 including a sole structure 45 having multiple impact-attenuation support members 30. Various features of the impact-attenuation support member 30 may contribute to attenuating a force or impact, such as a structure that changes under load, as well as a material from which the impact-attenuation support member 30 is constructed. These and other aspects of the disclosure will be described in more detail in other portions of this Detailed Description.

In FIG. 1, the sole structure 45 also includes an outsole 20 and a midsole portion 25, and the sole structure 45 may include various other elements not illustrated in FIG. 1 (e.g., insole, sockliner, heel counter, and the like). The article of footwear 10 also includes an upper 15, a tongue 50, and eyelets 60 for lacing a lace 55. One of ordinary skill in the art will recognize that footwear 10 is only an exemplary article of footwear and many other configurations are possible without departing from aspects of this disclosure. Although FIG. 1 depicts one arrangement of the one or more impact-attenuation support members 30, in other aspects of the technology the impact-attenuation support members 30 may have different sizes, groupings, positions, orientations, and the like. The illustrative figures depict, and the Specification describes, certain styles of articles of footwear, such as articles of footwear worn when engaging in athletic activities (e.g., basketball shoes, cross-training shoes, running shoes, and the like). But the subject matter described herein may be used in combination with other styles of articles of footwear, such as dress shoes, sandals, loafers, boots, and the like.

In the exemplary article of footwear 10 in FIG. 1, the upper 15 and the sole structure 45 generally form a foot-receiving space that encloses at least part of a foot when the article of footwear 10 is worn or donned. The foot-receiving space is accessible by inserting a foot through an opening 85 formed, for example, by the ankle collar 65. When describing various aspects of the article of footwear 10, relative terms may be used to aid in understanding relative relationships. For instance, the article of footwear 10 may be divided into three general regions: a forefoot region 75, a mid-foot region 80, and a heel region 70. The article of footwear 10 also includes a lateral side, a medial side, a superior portion, and an inferior portion. The forefoot region 75 generally includes portions of the article of footwear 10 corresponding with the toes and the joints connecting the metatarsals with the phalanges of a donned foot (not shown). The mid-foot region 80 generally includes portions of the article of footwear 10 corresponding with the arch area of a donned foot (not shown) and the heel region 70 corresponds with rear portions of the donned foot, including the calcaneus bone. The lateral side and the medial side extend through each of regions 70, 75, and 80 and correspond with opposite sides of the article of footwear 10. More particularly, the lateral side corresponds with an outside area of the donned foot (i.e., the surface that faces away from the other foot of a wearer), and the medial side corresponds with an inside area of the donned foot (i.e., the surface that faces toward the other foot of the wearer). Further, the superior portion and the inferior portion also extend through each of the regions 70, 75, and 80. The superior portion generally corresponds with a top portion that is oriented towards a wearer's head when the wearer's feet are positioned flat on the ground and the wearer is standing upright, whereas the inferior portion generally corresponds with a bottom portion oriented towards the bottom of the wearer's foot. These regions 70, 75, and 80, sides, and portions are not intended to demarcate precise areas of the article of footwear 10. On the other hand, they are intended to represent general areas of the article of footwear 10 to aid in understanding the various descriptions provided in this Specification. In addition, the regions, sides, and portions are provided for explanatory and illustrative purposes and are not meant to require a human being for interpretive purposes.

As previously indicated, the sole structure 45 may include multiple components. In FIG. 1, the sole structure 45 includes the outsole 20 made of a relatively hard and durable material, such as rubber, that is in direct contact with the ground, floor, or other surface. The sole structure 45 also includes the midsole portion 25 formed from a material that provides cushioning and absorbs/attenuates impact force during normal wear and/or athletic training or performance. Examples of materials often used in midsoles are, for example, ethylene vinyl acetate (EVA), thermoplastic polyurethane (TPU), thermoplastic elastomer (e.g., polyether block amide), and the like. The sole structure 45 may further have additional components, including additional cushioning components (e.g., springs, air bags, and the like), functional components (e.g., motion control elements to address pronation or supination), protective elements (e.g., resilient plates to prevent damage to the foot from hazards on the floor or ground), and the like. In addition, the sole structure 45 may include one or more insoles, sockliners, or other layers that are positioned between the foot-receiving space and the outsole 20.

These various components of the footwear 10 are delineated for explanatory purposes and are not necessarily entirely discrete components or layers. For example, the outsole 20 may include one or more portions that also form part of the midsole, the upper 15, or the midsole and the upper, and the midsole may include portions that form part of the outsole 20, the upper 15, or the outsole 20 and the upper 15. One or both of the midsole portion 25 and the outsole 20 may be coupled to the upper 15, throughout or at different portions of the sole structure 45. In addition, the impact-attenuation support member 30 may be considered part of the midsole, outsole, insole, or any combination thereof.

Exemplary Impact-Attenuation Support Member

The impact-attenuation support member 30 includes various features that may contribute to a response to a load, such as when the article of footwear 10 is worn and a person is standing, walking, running, jumping, etc. For instance, the impact-attenuation support member 30 may undergo various types of structural transformations, such as buckling, bending, hinging, pivoting, and the like. In one aspect, the impact-attenuation support member 30 is a three dimensional (3D) columnar support structures, and the structural transformation includes a shortening, compressing, or height reduction of the 3D columnar support structures brought about by the structural transformation under a load. In this description, the term "columnar" describes a compression-member structure that generally includes a support member having a capital (i.e., column top) and a pedestal (i.e., column bottom), the compression-member structure transmitting a weight (e.g., force) of a structure above the compression-member structure to another structural element(s) below the compression-member structure. Although the term "columnar" may include a round or cylindrical support member, in other aspects of the disclosure "columnar" may also include other complete or partial prismatic shapes having different numbers of sides or faces.

In additional aspects, the compression-member structure provides a desirable energy return upon impact when the article of footwear 10 is worn and a person is standing, walking, running, jumping, etc. The energy return may be influenced by the material(s) comprising the impact-attenuation support member 30. For example, the impact-attenuation support member 30 may comprise polymer or natural rubber materials that are inherently elastic and are able to absorb an impact force and at least partially return that energy back, such as thermoplastic polyurethane (TPU), ethylene vinyl acetate (EVA), nylon, PEBAX, polyurethane (PU), rubber, or any other inherently elastic polymer material, or any combinations thereof, that are suitable to be used in accordance with aspects hereof.

In further aspects, the impact-attenuation and force dampening provided by the impact-attenuation support members 30 under load is at least partially brought about by the structural configuration of the impact-attenuation support members 30. In this sense the impact-attenuation support members 30 are at least partially a metamaterial, such that the impact-attenuation functionality may be at least partially derived from characteristics other than the underlying material (e.g., EVA or TPU)—although, as described above, the characteristics of the underlying material, also contribute to the impact-attenuation and energy return functionality.

Figure 2A:
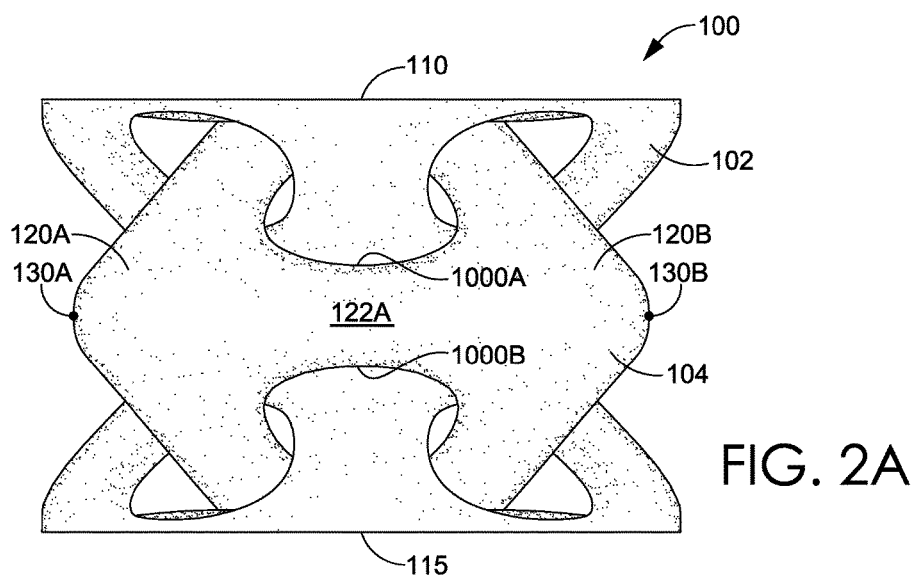
FIG. 2A depicts a front view of an impact-attenuation support member in accordance with an aspect hereof.

In order to better understand the structural configuration of the impact-attenuation support members in accordance with aspects hereof, reference is made to FIGS. 2A-2E (which show various enlarged views of a single impact-attenuation support member 100.) FIG. 2A illustrates a front view of the impact-attenuation support member 100 that is similar to the perspective and orientation of the impact-attenuation support member 30 in FIG. 1. Generally, the impact-attenuation support member 100 includes two discrete and interlaced elements, including a first interlaced element 102 and a second interlaced element 104. Both the first interlaced element 102 and the second interlaced element 104 are coupled to a top anchoring plate 110 and a bottom anchoring plate 115. As such, respective positions the first interlaced element 102 and the second interlaced element 104 are immobilized together at the top anchoring plate 110 and the bottom anchoring plate 115. In addition, each of the first interlaced element 102 and the second interlaced element 104 includes respective portions between the top anchoring plate 110 and the bottom anchoring plate 104 that are interlinked with one another, yet freely movable in at least one direction.

Figure 2B:
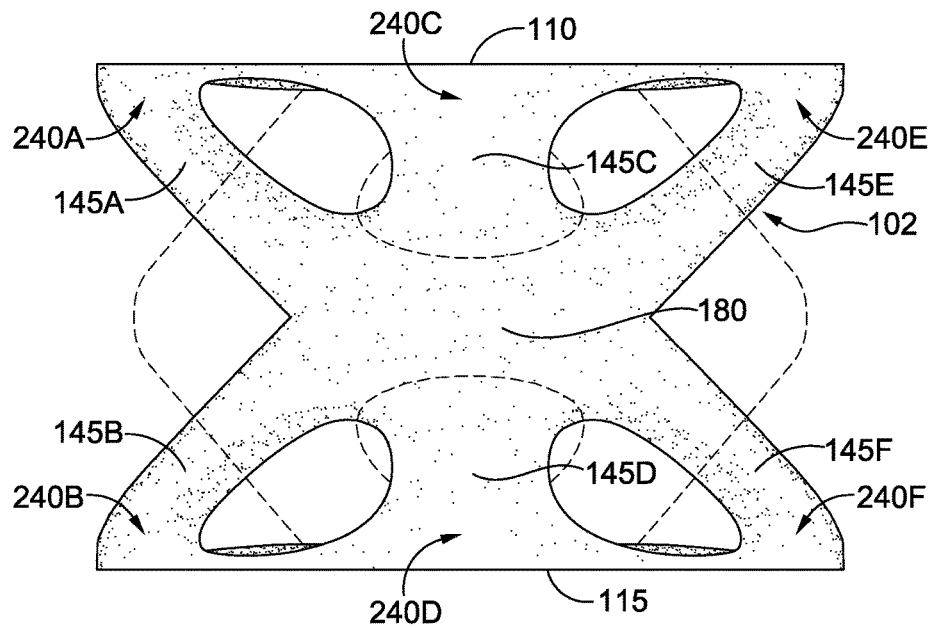
FIG. 2B depicts the impact-attenuation support member of FIG. 2A with certain portions in a ghosted view in accordance with an aspect hereof.

Referring now to FIG. 2B, additional aspects of the first interlaced element 102 will be described, and in FIG. 2B, the second interlaced element 104 is depicted in a ghosted view in order to better illustrate certain features of the first interlaced element 102. The first interlaced element 102 includes a mid-core support section 180. In addition, the first interlaced element includes a first set of support struts 145A, 145C, and 145E that extend from the mid-core support section 180 and that are coupled to the top anchoring plate 110. Although only three support struts are depicted in the first set of support struts in FIGS. 2A and 2B, in an aspect of the disclosure, another support strut (obstructed from view in FIGS. 2A and 2B) extends from the mid-core support section 180 and is coupled to the top anchoring plate 110. Each of the support struts 145A, 145C, and 145E connects to the top anchoring plate 110 at a respective connection point 240A, 240C, and 240E. Furthermore, the first interlaced element 102 includes a second set of support struts 145B, 145D, and 145F that extend from the mid-core support section 180 and that are coupled to the bottom anchoring plate 115. Each of the support struts 145B, 145D, and 145F connects to the bottom anchoring plate 115 at a respective connection point 240B, 240D, and 240F.

Figure 2C:
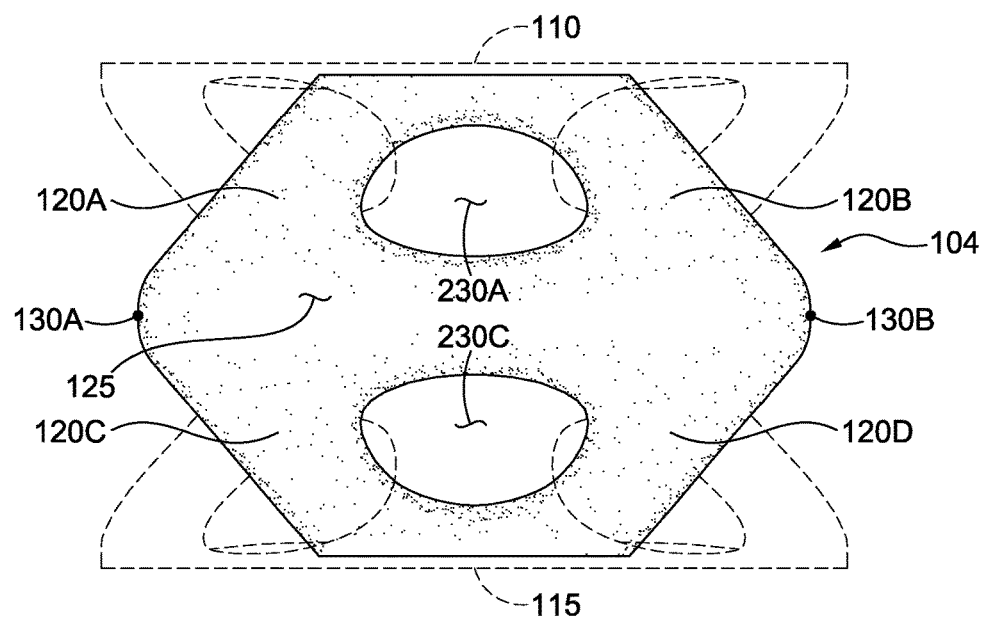
FIG. 2C depicts the impact-attenuation support member of FIG. 2A with certain portions in a ghosted view in accordance with an aspect hereof.

Referring now to FIG. 2C, additional aspects of the second interlaced element 102 will be described, and in FIG. 2C, the first interlaced element 102 is depicted in a ghosted view in order to better illustrate certain features of the second interlaced element 104. The second interlaced element 104 generally includes a substantially ellipsoid-shaped shell wall 125 that, for explanatory purposes, is constructed from a series of ligaments.

FIG. 2C illustratively depicts a set of substantially vertically-oriented ligaments 120A, 120B, 120C, and 120D, as well as a substantially horizontally-oriented ligament 122A. The terms vertical and horizontal are for reference only when describing the second interlaced element 104 as depicted in FIG. 2C, and it is understood that the identified ligaments may not be vertically oriented or horizontally oriented in other aspects when the second interlaced element includes an orientation different from that depicted in FIG. 2C. The ligaments are joined and integrated in a networked manner to form the ellipsoid shaped shell wall 125. In this sense, there are not necessarily clear delineations between one ligament that is integrally connected with another ligament.

For illustrative purposes, ligament junctions 130A and 130B are identified in FIG. 2C to depict junctions at which a plurality of ligaments may be joined with one another to form the ellipsoid shaped shell wall 125. In a further aspect, each of the ligaments includes a substantially rounded or convex outward-facing surface, which contributes to the generally rounded nature of the substantially ellipsoid-shaped shell wall 125. The ellipsoid shaped shell wall 125 also includes an array of voids 230A and 230C that are arranged throughout the ellipsoid shaped shell wall 125 and that space the ligaments apart from one another. The substantially ellipsoid-shaped shell wall 125 is connected to the top anchoring plate 110 and to the bottom anchoring plate 115, and this aspect is more clearly illustrated in FIG. 2E by connection points 116A and 116B (connecting to the tope anchoring plate 110) and connection points 117A and 117B (connecting to the bottom anchoring plate 115). The second interlaced element 104 may include other ligaments and voids that are obstructed from view in FIGS. 2A and 2C.

Figure 2D:
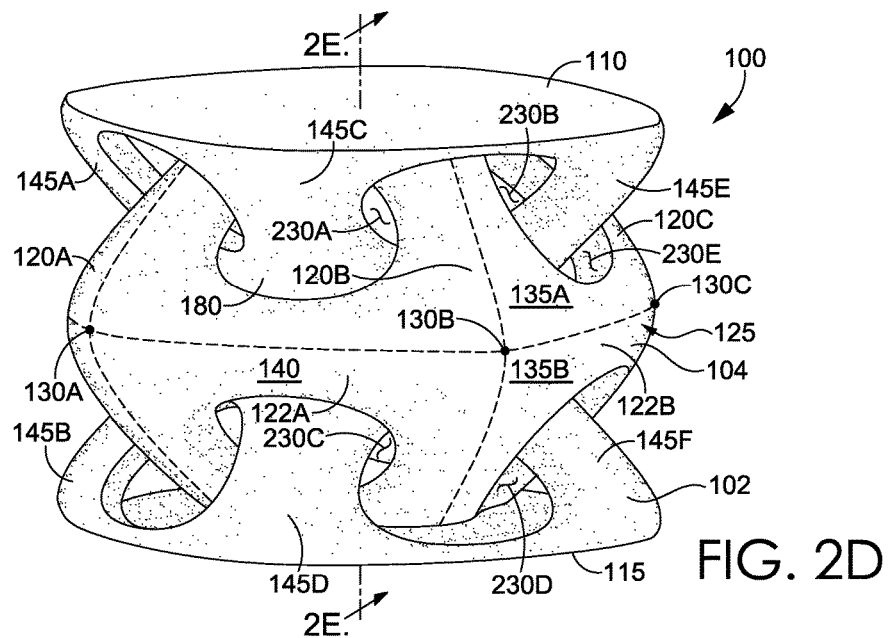
FIG. 2D depicts a front-lateral view of the impact-attenuation support member in accordance with an aspect hereof.
Figure 2E:
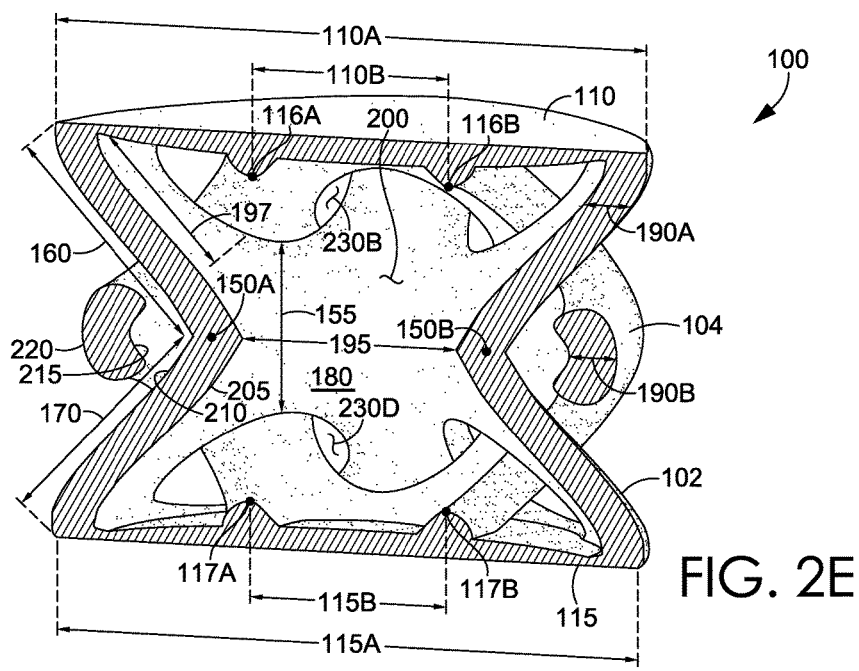
FIG. 2E depicts a cross-section of the impact-attenuation support member in FIG. 2D in accordance with an aspect hereof.

Some structural features of the first interlaced element 102 and the second interlaced element 104 have been described with respect to FIGS. 2A-2C, including the mid-core support section 180 and the struts of the first interlaced element 102, and the ligaments and voids that form the substantially ellipsoid-shaped shell wall 125 of the second interlaced element 104. Referring now to FIGS. 2D and 2E additional aspects of the disclosure will be described, some of which include the interlaced nature of the first and second interlaced elements 102 and 104. mm FIG. 2D depicts a front-lateral perspective view of the impact-attenuation support member 100, and FIG. 2E depicts a cross-section of the impact-attenuation support member 100 taken along reference plane 2E-2E in FIG. 2D.

In one aspect of the disclosure, the ellipsoid shaped shell wall 125 at least partially encloses the first interlaced element 102, in particular at the mid-core support section 180 of the first interlaced element 102. In addition, each of the struts of the first interlaced element 102 extends from the mid-core support section 180 and through a void in the ellipsoid shaped shell wall 125 of the second interlaced element 104. As such, although the mid-core support section 180 of the first interlaced element 102 is internal to the second interlaced element 104, the first interlaced element 102 includes members that extend external to the second interlaced element 104 at top and bottom anchoring plates 110 and 115, respectively (i.e., capital and pedestal).

In a further aspect of the disclosure, as shown in FIG. 2E, a cross section of the first interlaced element 102 includes an hourglass-shaped outline with a substantially hollow core. As depicted, the mid-core support section 180 and the support struts 145A, 145B, 145C, 145D, 145E and 145F at least partially enclose a cavity 200 with an interior surface 205 facing the cavity 200 and an exterior surface 210 facing away from the cavity 200. In one aspect, this configuration of the first interlaced element 102 having a substantially hollow cavity may allow for a lighter construction with a high energy return by providing cushioning through the inherent properties of the material(s) used in the construction of the first interlaced element 102 (e.g., various elastic materials, such as EVA, TPU, polyester, and the like), through the combination of interlaced structures, or through a combination of material properties and structure.

In addition, the first set of support struts 145A, 145C, and 145E form a capital-oriented portion of the first interlaced element 102, and the second set of support struts 145B, 145D, and 145F form a pedestal-oriented portion of the first interlaced element 102. The first interlaced element 102 includes strut junctions 150A and 150B that transition from the first set of support struts to the second set of support struts. Moreover, the capital-oriented portion may be a substantial mirror image of the pedestal-oriented portion. As such, the approximate distance 160 from the junction 150A to the top anchoring plate 110 may be substantially similar to the approximate distance 170 from the junction 150A to the bottom anchoring plate 115.

The first interlaced element 102 also may include various other dimensions illustrated by FIG. 2E. For example, the first interlaced element 102 includes a wall thickness 190A that extends between the interior surface 205 and the exterior surface 210. In addition, the mid-core support section 180 includes a width 195 that extends from one strut junction 150A to the other strut junction 150B, as well as a height 155. The struts also include certain dimensions, such as a strut length 197, which is measured from a connection point (to an anchoring plate) to a point at which the strut connects to the mid-core support section 180.

As previously explained, the first set of support struts 145A, 145C, and 145E attach to the top anchoring plate 110 at a first set of connection points 240A, 240B, and 240C, and the second set of support struts 145B, 15D, and 145F attach to the bottom anchoring plate 115 at a second set of connection points 240D, 240E, and 240F. In addition, as illustrated in FIG. 2E, the first set of connection points are spaced apart by a width 110A, and the second set of connection points are spaced apart by a width 115A.

In additional aspects of the present disclosure, the ligaments include an inward facing surface (e.g., 215 in FIG.

2E) and an outward facing surface 220. The inward facing surface 215 faces towards the outer surface 210 of the first interlaced element 102. The outward facing surface 220 faces away from the first interlaced element 102. Each ligament includes a thickness (e.g., 190B) that extends between the inward facing surface 215 and the outward facing surface 220.

As depicted in FIG. 2B, the ellipsoid-shaped shell wall 125 is connected to the top anchoring plate 110 at top connection points (e.g., 116A and 116B) and is connected to the bottom anchoring plate 115 at bottom connection points (e.g., 117A and 117B). In an aspect of the disclosure, the top connection points are spaced apart by a width 110B that is less than the width 110A of the strut connection points. In this respect, the ellipsoid-shaped wall connects to the top anchoring plate inward of, or internal to, the struts. Similarly, the bottom connection points are spaced apart by a width 115B that is less than the width 115A of the strut connection points. In this respect, the ellipsoid-shaped wall connects to the top anchoring plate and to the bottom anchoring plate inward of, or internal to, the struts.

The first and second interlaced elements 102 and 104 may operate in various manners to contribute the impact-attenuation features of the impact-attenuation support member 100. In aspects of this disclosure, the first and second interlaced elements 102 and 104 are in an interlaced relationship, such that portions of the elements are interlinked and spaced apart from each other. As such, these portions may form one or more cavities in the voids between the elements. In a further aspect of this disclosure, when the impact-attenuation support member 100 undergoes a deformation due to a load, (e.g. height reduction of the affected impact-attenuation support member, lateral expansion of element 104, and the like) the air occupying the spaces between elements 102 and 104 is essentially pushed out. As such, the first interlaced element 102 may come into contact with the second interlaced element 104 if the impact-attenuation support member receives a force having a sufficient magnitude. For instance, at least a top edge 1000A and a bottom edge 1000B (shown in FIG. 2A) of the ligaments forming the ellipsoid-shaped shell wall 125 may contact the struts passing through the voids 230A and 230C. In this respect, element 104 stabilizes element 102 by impeding possible lateral shifting of element 102 by enveloping the mid-core support section 180. As such, the interlaced relationship between the first and second interlaced elements 102 and 104 allows for both elements to abut each other when compressed and deformed due to an impact force.

As previously described, the cross section of element 102, may include a general hourglass shape when the cross section is taken along a reference plane that bisects element 102 by passing through the first and second sets of supports struts and through the mid-core support section. In other words, element 102 tapers from a larger width near the top and bottom anchoring plates to a smaller width near the mid-core support section. Thus, due at least in part to the decreasing radius around the mid-core support section of element 102, element 102 may undergo lateral shifting under an impact force, such as when the impact force is not completely parallel to a longitudinal axis of the impact-attenuation support member, in accordance with aspects hereof. Therefore, the ellipsoid shaped shell wall 125 of element 104 interlaced with element 102 and enveloping the mid-core support section 180 of element 102, at least partially stabilizes element 102 and may reduce lateral shifting of element 102.

An amount of impact attenuation provided by the impact-attenuation support member may be tuned by adjusting various parameters and properties of the first interlaced element 102 and the second interlaced element 104. For instance, the wall thickness 190A of the first interlaced element 102 (extending between the interior surface 205 and the outer surface 210) may be increased or decreased. In addition, a ratio between the width 195 of the mid-core support section and the length 197 of each individual support strut may also be adjusted to affect an amount of cushioning and stability provided by the first interlaced element 102. Additionally, with respect to the second interlaced element 104, the wall thickness 190B, the length or width of the ligaments, the sizes of the voids, or any combination thereof may be modified. For example, thicker struts or ligaments may provide a "stiffer" impact-attenuation support member and/or a more responsive impact-attenuation support member or less responsive impact-attenuation support member, depending on the materials used.

Figure 3A:
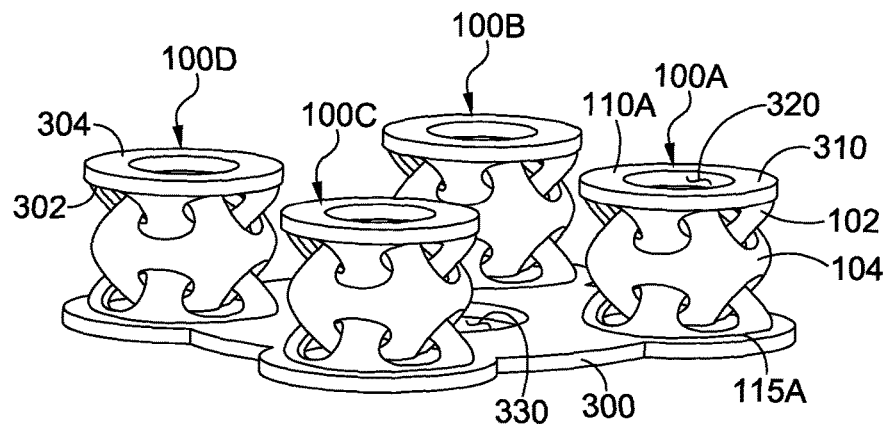
FIG. 3A depicts a carrier disk for supporting impact-attenuation support members in accordance with aspects hereof.

When employed in an article of footwear construction, such as the one shown in FIG. 1, two or more impact-attenuation support members 100 may be provided to offer a balanced support from different areas of the sole structure 45. For example, the different areas may include, for example, a proximal area, a distal area, a lateral area, and a medial area, to provide shock absorption in the article of footwear construction in accordance with aspects hereof. Therefore, in order to provide even greater stability, two or more impact-attenuation support members may be provided together by anchoring the two or more impact-attenuation support members to a disk carrier (e.g. disk carrier 300) as shown in FIG. 3A.

The disc carrier 300 may serve a dual purpose of preventing the shifting of each impact-attenuation support member, and ensuring an accurate and efficient placement of each impact-attenuation support member within a designated location within sole structure 45. In other words, the disk carrier (e.g., 300) may allow the simultaneous and accurate placement of two or more impact-attenuation support members within a designated space within a sole structure, such as sole structure 45. For example, FIG. 3A shows a disc carrier 300 with four anchored impact-attenuation support members (e.g., 100A, 100B, 100C, and 100D) where when anchored together, the disc carrier 300 and the impact-attenuation support members 100A, 100B, 100C, and 100D, can be considered to be a single piece and thus, be handled as a single piece, simplifying the handling of the impact-attenuation support members during manufacturing. Additionally, because the impact-attenuation support members 100A, 100B, 100C, and 100D are anchored to disk carrier 300, impact-attenuation support members 100A, 100B, 100C, and 100D, stay in place even when the article of footwear comprising these impact-attenuation support members, are under any use conditions (i.e. moderate, normal, or highly strenuous use conditions).

Figure 3B:
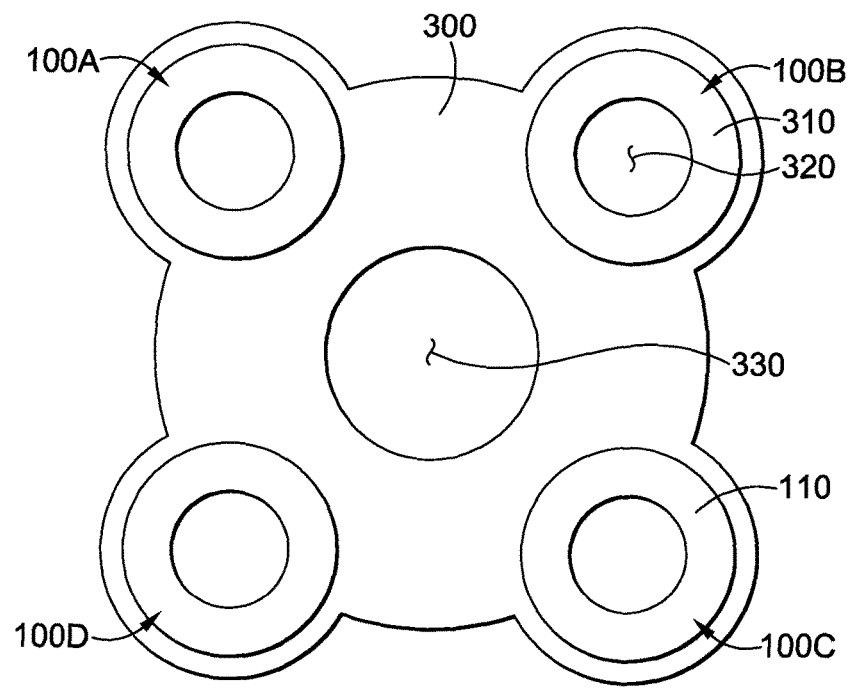
FIG. 3B depicts a top view of the carrier disk of FIG. 3A in accordance with aspects hereof.

FIG. 3B shows a top plain view of a disc carrier 300 supporting four impact-attenuation support members 100A, 100B, 100C, and 100D. Each impact-attenuation support member may be anchored to the disk carrier 300 by each impact-attenuation support member's bottom anchoring plate. The top anchoring plates 110 of each impact-attenuation support member 100A, 100B, 100C, and 100D, may be detached from any other structure on their respective superior surfaces 304, which is opposite their respective inferior surfaces 302 facing the interlaced first and second impact-attenuation elements. Further, each impact-attenuation support member may comprise a respective raised structure 310 around a perimeter of each top anchoring plate's superior surface 304. Each raised structure 310 may comprise a valley 320 at the center of each raised structure 310. The valley 320 may comprise a first perimeter that is smaller than a second perimeter of the raised structure 310, such that the valley 320 is completely enclosed within the raised lip 310. Additionally, the shape of the valley 320 may substantially correspond to the shape of the raised lip 310, or the alternative, may be of a different shape. The valley 320 may serve as an anchoring point for each impact-attenuation support member to lock into place within an inner roof portion of a sole structure of an article of footwear when the disc carrier is mounted within a receiving cavity of the sole structure (e.g., as shown in FIG. 1). The disc carrier may also comprise a cavity 330 at its center, thereby reducing the total weight of the disc carrier and impact-attenuation support members' assembly. Additionally, the cavity 330 may also serve as an anchoring point for anchoring the disc carrier to an inner floor portion of the receiving cavity of the sole structure.

Alternative Configurations of Impact-Attenuation Support Members

Figure 4A:
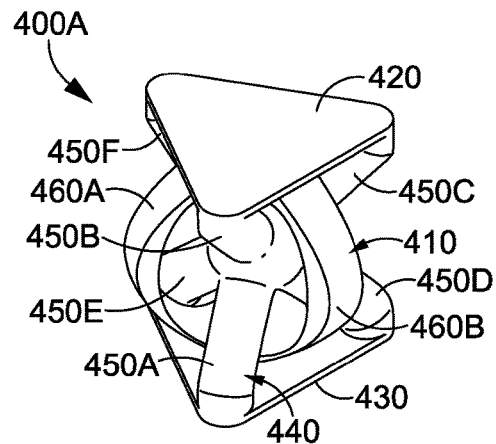
FIGS. 4A-4C depict exemplary alternative impact-attenuation support member in accordance with aspects hereof.
Figure 4B:
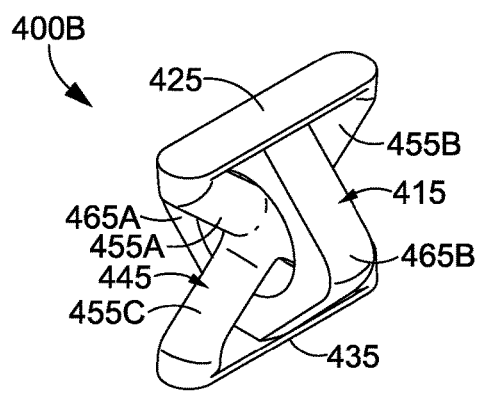
Figure 4C:
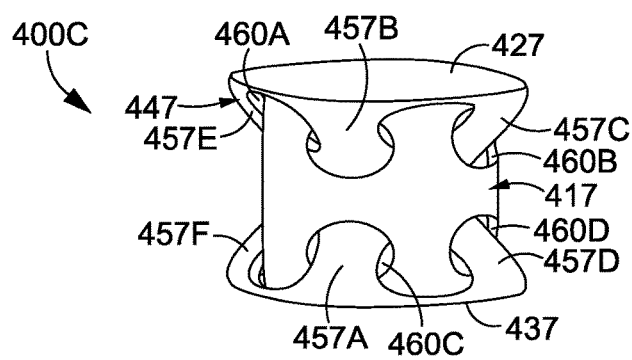

For illustrative purposes, FIGS. 4A-4C depict alternative configurations for an impact-attenuation support member in accordance with other aspects of this disclosure. For example, FIG. 4A depicts an impact-attenuation support member 400A having a first interlaced element 440 and a second interlaced element 410. The first interlaced element 440 includes a mid-core support section from which three support struts 450A, 450D, and 450E extend toward, and couple to, a bottom anchoring plate 430. In addition, the first interlaced element 440 includes three support struts 450F, 450B, and 450C that extend toward, and couple to, a top anchoring plate 420. The second interlaced element 410 includes a plurality of ligaments 460A and 460B that envelope at least the mid-core support section of the first interlaced element 440. Although not depicted in FIG. 4A, the second interlaced element 410 may also include a radial ligament that connects the ligaments and that circumscribes the mid-core support section of the first interlaced element 440.

FIG. 4B depicts another impact-attenuation support member 400B having a first interlaced element 445 and a second interlaced element 415. The first interlaced element 445 includes a mid-core support section from which two support struts 455C extend toward, and couple to, a bottom anchoring plate 435. In addition, the first interlaced element 445 includes two support struts 455A and 455B that extend toward, and couple to, a top anchoring plate 425. The second interlaced element 415 includes a plurality of ligaments 465A and 465B that at least partially envelope the mid-core support section of the first interlaced element 445. Although not depicted in FIG. 4B, the second interlaced element 415 may also include a radial ligament that connects the ligaments 465A and 465B and that circumscribes the mid-core support section of the first interlaced element 445.

In another aspect, FIG. 4C depicts an impact-attenuation support member 400C having a first interlaced element 447 and a second interlaced element 417. The impact-attenuation support member 400C is similar to the impact-attenuation support member 100 depicted in FIGS. 2A-2E. For instance, the first interlaced element 447 includes a mid-core support section from which the support struts 457A, 457D, and 457F extend toward, and couple to, the bottom anchoring plate 437. In addition, the support struts 457E, 457B, and 457C extend toward, and couple to, the top anchoring plate 427. Moreover, the second interlaced element 417 includes a network of ligaments (e.g., 460A and 460B) that envelope at least the mid-core support section of the first interlaced element 447. However, rather than forming an ellipsoid shaped wall (as in the impact-attenuation support member 100), the ligaments of the second interlaced element 417 form a cylinder shaped wall with a plurality of apertures from which the support struts of the first interlaced element 447 are configured to extend.

FIGS. 2A-2E and 4A-4C illustrate various alternative configurations of impact-attenuation support members having different numbers of ligaments and struts. In other aspects of the disclosure, an impact-attenuation support member may include additional struts. For instance, the impact-attenuation support member may include five or more struts connecting a mid-core support section to a top anchoring plate and five or more struts connecting the mid-core support section to a bottom anchoring plate.

Other Aspects of Impact-attenuation Systems for Footwear

Referring back to FIG. 1, the type or amount of compression the impact-attenuation support members in accordance with aspects hereof, may depend on a system in which the impact-attenuation support members are integrated. For example, the impact-attenuation support members may be integrated into the sole structure 45 and coupled between the outsole 20 and a bottom heel portion of the article of footwear. The impact-attenuation support members may potentially be placed in other portions of the article of footwear such as a front portion of the article of footwear, a mid portion of the article of footwear, or throughout the entire sole of the article of footwear.

Other aspects of the technology may include other variations from FIG. 1. For example, one portion of the midsole may include one or impact-attenuation support members having a first set of characteristics, and another portion of the midsole may include one or more impact-attenuation support members having a second set of characteristics, which is different from the first set of characteristics. The first set of characteristics and the second characteristics may be different from one another in one or more characteristics, including number of struts for the first interlaced element and shell wall structure for the second interlaced element, strut/ligament thickness, strut/ligament width, and the like. For instance, the heel portion may have a first set of impact-attenuation support members having a first set of characteristics, and the forefoot portion may have a second set of impact-attenuation support members having a second set of characteristics different from the first Furthermore, the mid-foot portion may have a third set of impact-attenuation support members having a third set of characteristics. The third set of characteristics may be the same as the first set or the same as the second set, or the third set of characteristics may be different from both the first set and the second set. These various combinations of different and/or similar sets of characteristics in different parts of the sole are only exemplary and are not meant to be exhaustive. Any combination of similar or different characteristics in the heel portion, mid-foot portion, and forefoot portion is intended to be included within the scope of this technology.

In a further aspect, the impact-attenuation support members within a same general region of the article of footwear may vary. For example, a heel portion may include impact-attenuation support members that include a first interlaced element having four or more struts, as well as impact-attenuation support members that include a first interlaced element having less than four struts. Moreover, a same general region may include impact-attenuation support members having different sizes. In other aspects, the characteristics of the impact-attenuation support members (e.g., size, strut number, material, strut/ligament thickness, strut/ligament width, lattice structure, number of layers, etc.) may gradually change from one portion of the article of footwear to another portion of the article of footwear. For instance, the impact-attenuation support member properties may gradually change from the medial side of the midsole to the lateral side of the midsole. In addition, the impact-attenuation support member properties may gradually change from the heel portion to the mid-foot portion and/or from the mid-foot portion to the forefoot portion of the article of footwear.

In a further aspect, the impact-attenuation support member properties may change from one portion of the impact-attenuation support member to another portion of the impact-attenuation support member. For example, one side of the impact-attenuation support member may have struts/ligaments having a first thickness and geometry, which may gradually change as the struts and the ligaments transition to an opposing side of the impact-attenuation support member.

In an aspect of the technology, this variability of the impact-attenuation support member is usable to tune the performance of the midsole for an amount of impact-attenuation, an amount of responsiveness, and placement of impact-attenuation (e.g., lateral, medial, heel, forefoot, mid-foot, etc.).

The impact-attenuation support members may be combined with one or more other midsole structures. For example, impact-attenuation support members may be arranged in the heel portion of the midsole, and the forefoot and mid-foot portions might include another type of impact-attenuation structure (e.g., foam, spring, fluid-filled chamber, and the like). In one aspect, the impact-attenuation support members are arranged in a cartridge that is insertable and retainable between the outsole and another portion of the sole structure.

Although FIG. 1 depicts an article of footwear having an upper 15 and a sole structure 45, other aspects of the present technology may be directed to the sole structure without the upper. For example, another aspect is directed to a midsole portion that includes impact-attenuation support members and that can be combined with other sole components to construct a bottom unit for an article of footwear. Additionally, a further aspect includes a sole structure (e.g. outsole and midsole) that includes impact-attenuation support members that can be coupled with an upper. Thus, some aspects may not include the upper or certain portions of the outsole or certain parts of the midsole.

Method of Manufacturing an Impact-Attenuation Support Member

Figure 5:
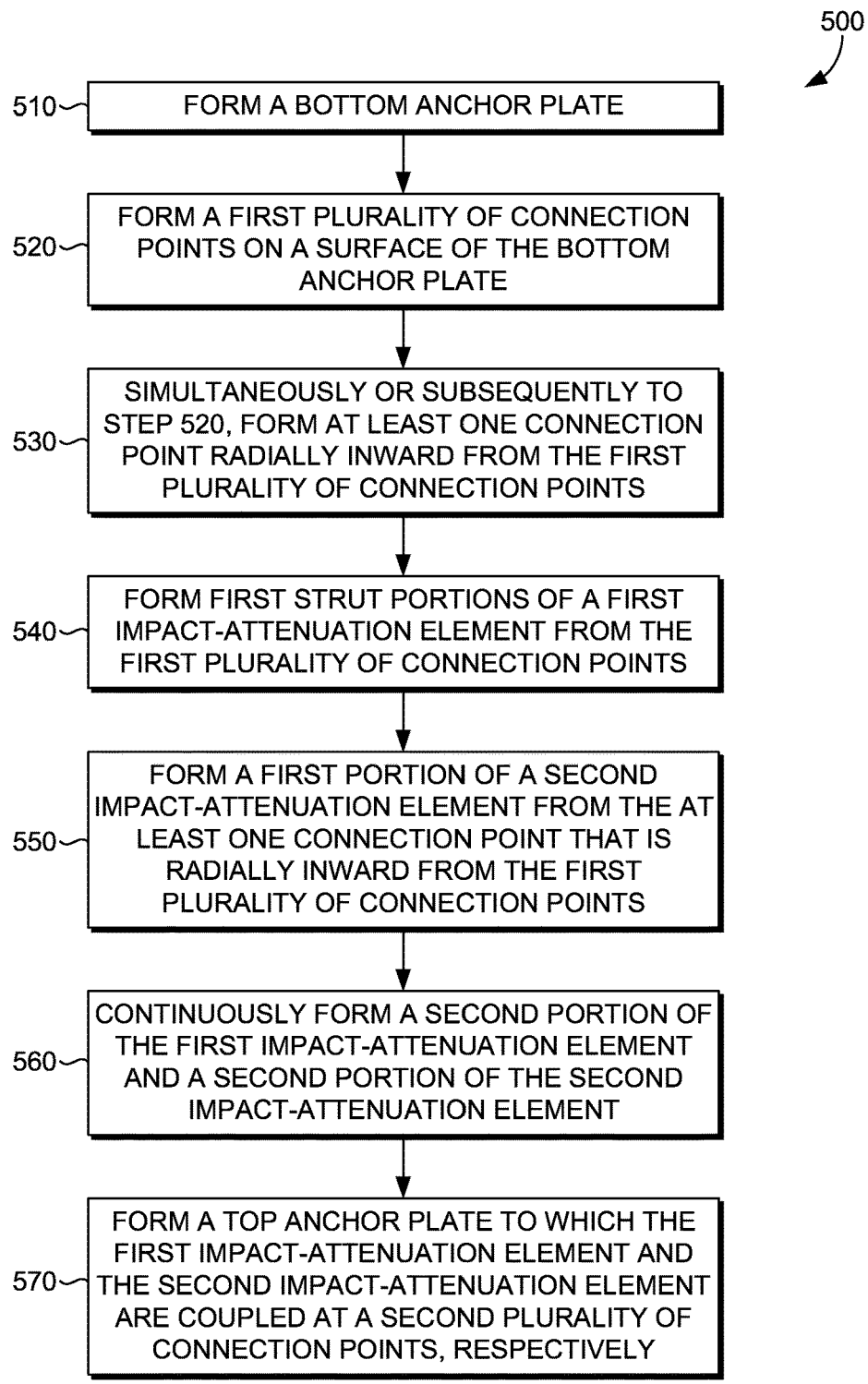
FIG. 5 depicts a flow chart illustrating a method in accordance with an aspect of the present invention.

Referring now to FIG. 5 a flow chart is depicted that outlines steps for performing an exemplary method 500 for manufacturing the impact-attenuation support members in accordance with aspects hereof. It is noted that the steps depicted are not to be construed as happening sequentially but rather, they are exemplary steps that may be performed in a different order than the one presented herein. When describing the method 500, reference may also be made to one or more components described with respect to other figures in the instant Detailed Description.

At step 510 an impact-attenuation support member may be manufactured by forming a bottom anchor plate (e.g., 115) from an elastomeric polymer material. For instance, a bottom anchor plate may be cast, molded, 3D printed, laser sintered, ablated, and the like.

Step 520 includes forming a first plurality of connection points (e.g., 240B, 240D, and 240F) on a surface of the bottom anchor plate for coupling a first impact-attenuation element (e.g., 102) to the surface of the bottom anchor plate, the first plurality of connection points being radially arranged around a center reference axis. In one aspect, the first plurality of connection points are 3D printed onto the bottom anchor plate, although any of the other manufacturing techniques mentioned above may also be implemented.

In a further aspect, at step 530, at least one connection point (e.g., 117A or 117B) is formed radially inward from the first plurality of connection points on the surface of the bottom anchor plate, the at least one connection point for coupling a second impact-attenuation element (e.g., 104) to the surface of the bottom anchor plate. The at least one connection point may be formed before the first plurality of connection points, after the first plurality of connection points, or at the same time as the first plurality of connection points. Similar to the first plurality of connection points, the at least one connection point may also be 3D printed onto the bottom anchor plate.

At step 540 first portions (e.g., 145B, 145D, and 145F) of the first impact-attenuation element are formed extending from the first plurality of connection points, such that the first impact-attenuation element tapers from the first plurality of connection points to a radially smaller middle portion (e.g., 180). The radially smaller middle portion is spaced apart from the surface of the bottom anchor plate. In one aspect, the first portions may be 3D printed by an additive manufacturing technique that builds from the first plurality of connection points.

Further, step 550 includes forming a first portion (e.g., bottom portion of wall 125) of the second impact-attenuation element are formed from the at least one connection point, such that the second impact-attenuation element extends away from the surface of the bottom anchor plate to a radially larger middle portion, which includes a radial segment that envelops the radially smaller middle portion of the first impact-attenuation element. In one aspect, the first portion of the second impact-attenuation element is 3D printed by an additive manufacturing technique by building material from the at least one connection point. The first portion of the second impact-attenuation element may be formed at the substantially same time as the first portion of the first impact-attenuation element.

Step 560 includes forming a second portion (e.g., struts 145A, 145C, and 145E) of the first impact-attenuation element and a second portion (e.g., ligaments 120A and 120B) of the second impact-attenuation, such that the first impact-attenuation element extends away from the radially smaller middle portion, away from the center reference axis, and flares from the radially smaller middle portion outward to a second plurality of connection points. In addition, the second portion of the second impact-attenuation element is formed to taper toward at least a second connection point, which is radially inward of the second plurality of connection points. As previously described, the second portions of the first and second impact-attenuation elements may be 3D printed by an additive manufacturing technique. For instance, the second portion of the first impact-attenuation element may be built onto the radially smaller portion, and the second portion of the second impact-attenuation element may be built onto the radially larger portion. The second portions of the first and second impact-attenuation elements may be formed at the substantially same time.

At step 570, a top anchor plate (e.g., 110) is formed, such as by casting, molding, 3D printing, laser sintering, ablating, and the like. The second plurality of connection points of the first impact-attenuation element are coupled to the top anchor plate. In addition, the at least one second connection point of the second impact-attenuation element is coupled to the top anchor plate.

Various aspects of the present disclosure have been provided in the precedent description, and these aspects may be combined in different manners. For example, a further aspect of an impact-attenuation support member includes a first impact-attenuation element comprising a mid-core support section, a first set of support struts extending from the mid-core support section, and a second set of support struts extending from the mid-core support section in a direction generally opposite to the first set of support struts. The first impact-attenuation element is configured to absorb a force by longitudinally compressing. The impact-attenuation support member further comprises a second impact-attenuation element, the second impact-attenuation element comprising a network of ligaments joined together at ligament junctions, where the network of ligaments form a support frame that at least partially encloses a central cavity and that includes a first set and second set of apertures. The mid-core support section of the first impact-attenuation element is positioned in the central cavity of the second impact-attenuation element and is at least partially enclosed by the support frame of the second impact-attenuation element. When the first impact-attenuation element and the second impact-attenuation element are assembled together, the first set of support struts extend from the mid-core support section of the first impact-attenuation element through the first set of apertures of the second impact-attenuation element, and the second set of support struts extend from the mid-core support section of the first impact-attenuation element through the second set of apertures of the second impact-attenuation element, thereby interlacing the first impact-attenuation element with the second impact-attenuation element.

Generally, the first impact-attenuation element may comprise an hourglass-shaped outline cross section, the cross-section taken along a reference plane that bisects the first impact-attenuation element by passing through the first and the second sets of supports struts and through the mid-core support section. In other words, the first and second set of support struts of the first impact-attenuation element taper from a larger width near distal portions of the first and the second set of support struts to a smaller width at the mid-core support section. The distal portions of the first and second set of support struts of the first impact-attenuation element are coupled to first and second base structures near a perimeter of the first and the second base structures, respectively.

Further, the support frame of the second impact-attenuation element comprises an ellipsoid-shaped wall having a longitudinal axis and a lateral axis. The ellipsoid-shaped wall includes a radial segment that is substantially aligned with the lateral axis and is configured to envelop the mid-core support section of the first impact-attenuation element. The ellipsoid-shaped wall is also coupled to the first and the second base structures on opposing ends of the longitudinal axis, of the second impact-attenuation element, internally from the distal portions of the first and the second set of support struts of the first impact-attenuation element.

In a different aspect, each of the impact-attenuation support members may comprise a first impact-attenuation element coupled to a bottom anchoring plate at a first plurality of connection points and to a top anchoring plate at a second plurality of connection points. The first impact-attenuation element may additionally include a first middle portion between the first plurality of connection points and the second plurality of connection points. Each of the impact-attenuation support members may further comprise a second impact-attenuation element coupled to the bottom anchoring plate at at least a first connection that is inward of the first plurality of connection points of the first impact-attenuation element. The second impact-attenuation element may also be coupled to the top anchoring plate at at least a second connection that is inward of the second plurality of connection points of the first impact attenuation element. The second impact-attenuation element may further include a second middle portion between the first connection and the second connection, where the second middle portion of the second impact-attenuation element is configured to at least partially circumscribe the first middle portion of the first impact-attenuation support element.

The first impact-attenuation element may comprise at least two sets of two support struts that extend from the first middle portion, where one set may terminate near the first set of connection points and the other one may terminate near the second set of connection points, respectively. The first impact-attenuation element may taper from a first size near the first set of connection points to a smaller second size near the first middle portion, and from a third size near the second set of connection points to the smaller second size near the first middle portion.

The second impact-attenuation element on the other hand, may comprise an ellipsoid-shaped wall having a longitudinal axis and a lateral axis, where the lateral axis is substantially aligned with a radial segment of the ellipsoid-shaped wall. The ellipsoid-shaped wall may attach to the top and bottom anchoring plates within a perimeter formed by the at least two sets of two support struts. Further, the first impact-attenuation element may be in an interlaced relationship with the second impact-attenuation element by having each of the at least two support struts of each set of support struts extend through each respective through aperture in a plurality of through apertures in the ellipsoid-shaped wall.

Further, in accordance with aspects hereof, a disc carrier may be employed to mount one or more impact-attenuation support members via their corresponding bottom anchoring plates. A fully loaded disc carrier may be mounted within a receiving structure in a sole structure of an article of footwear according to aspects hereof.

Furthermore, aspects herein are directed to methods of manufacturing the impact-attenuation support members discussed above. For example, an impact-attenuation support member may be manufactured by initially forming a bottom anchor plate from an elastomeric polymer material. Then, a first plurality of connection points may be formed on a surface of the bottom anchor plate for coupling a first impact-attenuation element to the surface of the bottom anchor plate, where the first plurality of connection points may be radially arranged around a center reference axis. Simultaneously or subsequently, at least one connection point radially inward from the first plurality of connection points may also be formed on the surface of the bottom anchor plate, the at least one connection point coupling a second impact-attenuation element to the surface of the bottom anchor plate. Then, first portions of the first impact-attenuation element and a first portion of the second impact-attenuation element may be formed on the surface of the bottom anchor plate, such that the first impact-attenuation element tapers from the first plurality of connection points to a radially smaller middle portion spaced apart from the surface of the bottom anchor plate, and such that the second impact-attenuation element extends away from the surface of the anchor plate to a radially larger middle portion, which includes a radial segment that envelops the radially smaller middle portion of the first impact-attenuation element. Then, a second portion of the first impact-attenuation element and a second portion of the second impact-attenuation element may be formed simultaneously or subsequently, such that the first impact-attenuation element extends away from the radially smaller middle portion, away from the center reference axis, and flares from the radially smaller middle portion outward to a second plurality of connection points, and the second impact-attenuation element tapers toward at least a second connection point, which is radially inward of the second plurality of connection points.

Finally, a top anchor plate may be formed, to which the second plurality of connection points of the first impact-attenuation element and the at least one second connection point of the second impact-attenuation element are coupled.

The impact-attenuation support members in accordance with aspects herein may be manufactured for example, using additive manufacturing methods such as, for example, laser sintering, 3D printing, fused deposition modeling (FDM) PolyJet, Stereolithography (SLA), etc., or any other type of technology usable in accordance with aspects herein. The particular manufacturing method and technology may be selected based on the complexity and suitability of the method, and the types of materials desired for use in accordance with aspects hereof.

The first impact-attenuation element and the second impact-attenuation element of each impact-attenuation support member, in accordance with aspects herein, may be manufactured from one or more of natural rubbers, synthetic elastic polymers such as polyester, ethyl vinyl acetate (EVA), polyurethane (PU), thermoplastic polyurethane (TPU), nylon, or any other suitable material(s) available, or mixture(s) of materials available. The materials may be selected based upon their physical properties such as elasticity, durability, resiliency, stability, ease of handling, visual appeal (e.g., color, shine), etc. Further, the first impact-attenuation element may be manufactured from the same material(s) as the second-impact-attenuation element, or alternatively, the first impact-attenuation element may be manufactured from a different material(s) than the second impact-attenuation element.

From the foregoing, it will be seen that aspects hereof are well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible configurations and alternatives may be made of aspects herein without departing from the scope thereof, it is to be understood that all matter herein set forth or shown in the accompanying drawings is to be interpreted as illustrative and not in a limiting sense.

The invention claimed is:

1. An impact-attenuation support member for an article of footwear comprising:
a first impact-attenuation element comprising a mid-core support section, a first set of support struts extending from the mid-core support section, and a second set of support struts extending from the mid-core support section in a direction generally opposite to the first set of support struts, wherein the first impact-attenuation element is configured to absorb a force by longitudinally compressing; and
a second impact-attenuation element comprising a network of ligaments joined at ligament junctions, the network of ligaments forming a support frame that at least partially encloses a central cavity and that includes a first set of apertures and a second set of apertures,
wherein the mid-core support section of the first impact-attenuation element is positioned in the central cavity of the second impact-attenuation element and is at least partially enclosed by the support frame of the second impact-attenuation element,
wherein the first set of support struts extend from the mid-core support section of the first impact-attenuation element and through the first set of apertures of the second impact-attenuation element, and
wherein the second set of support struts extend from the mid-core support section of the first impact-attenuation element and through the second set of apertures of the second impact-attenuation element, such that the first impact-attenuation element is interlaced with the second impact-attenuation element.

2. The impact-attenuation support member of claim 1 further comprising, a first base structure and a second base structure coupled to opposing ends of the first and the second impact-attenuation elements.

3. The impact-attenuation support member of claim 2, wherein the first set of support struts of the first impact-attenuation element are coupled to the first base structure and the second set of support struts of the first impact-attenuation element are coupled to the second base structure, the first and second set of support struts supporting the mid-core support section of the first impact-attenuation element between the first and second base structures, and wherein the first impact-attenuation element tapers from a larger width at the first and second base structures to a smaller width at the mid-core support section.

4. The impact-attenuation support member of claim 3, wherein a cross section of the first impact-attenuation element includes an hourglass-shaped outline, the cross section taken along a reference plane that bisects the first impact-attenuation element by passing through the first and second sets of supports struts and through the mid-core support section.

5. The impact-attenuation support member of claim 3, wherein the second impact-attenuation element comprises an ellipsoid-shaped wall having a longitudinal axis and a lateral axis, and wherein the ellipsoid-shaped wall includes a radial segment that is substantially aligned with the lateral axis and that envelops the mid-core support section of the first impact-attenuation element.

6. The impact-attenuation support member of claim 5, wherein distal portions of the first and the second set of support struts of the first impact-attenuation element are coupled to the first and second base structures near a perimeter of the first and second base structures, and wherein the ellipsoid-shaped wall is coupled to the first and second base structures on opposing ends of the longitudinal axis, internally from the distal portions of the first and the second set of support struts of the first impact-attenuation element.

7. The impact-attenuation support member of claim 1, wherein the first and the second impact-attenuation elements are formed from at least one of a natural rubber and elastic synthetic polymer material.

8. An impact-attenuation support member for an article of footwear comprising:
a bottom anchoring plate;
a top anchoring plate generally opposing, and spaced apart from, the bottom anchoring plate;

a first impact-attenuation element coupled to the bottom anchoring plate at a first plurality of connection points and to the top anchoring plate at a second plurality of connection points, the first impact-attenuation element including a first middle portion between the first plurality of connection points and the second plurality of connection points; and a second impact-attenuation element coupled to the bottom anchoring plate by at least one first connection that is inward of the first plurality of connection points and coupled to the top anchoring plate by at least one second connection that is inward of the second plurality of connection points, the second impact-attenuation element including a second middle portion between the at least one first connection and the at least one second connection, wherein the second middle portion at least partially circumscribes the first middle portion.

9. The impact-attenuation support member of claim 8, wherein the first impact-attenuation element tapers from a first size near the first set of connection points to a smaller second size near the first middle portion, and wherein the first impact-attenuation element tapers from a third size near the second set of connection points to the smaller second size near the first middle portion.

10. The impact-attenuation support member of claim 9, wherein the second impact-attenuation element comprises an ellipsoid-shaped wall having a longitudinal axis and a lateral axis, and wherein a radial segment at the second middle portion is substantially aligned with the lateral axis, and wherein the second middle portion continuously circumscribes the middle portion.

11. The impact-attenuation support member of claim 10, wherein the first impact-attenuation element includes at least two support struts that extend from the first middle portion and terminate near the first set of connection points, and wherein the at least one first connection attaches to the bottom anchoring plate within a perimeter formed by the at least two support struts.

12. The impact-attenuation support member of claim 11, wherein the at least two support struts extend through a set of through apertures in the ellipsoid-shaped wall.

13. The impact-attenuation support member of claim 10, wherein the first impact-attenuation element includes at least two support struts that extend from the first middle portion and terminate near the second set of connection points, and wherein the at least one second connection attaches to the top anchoring plate within a perimeter formed by the at least two support struts.

14. The impact-attenuation support member of claim 13, wherein the at least two support struts extend through a set of through apertures in the ellipsoid shaped shell wall.

15. The impact-attenuation support member of claim 8 further comprising, a disc carrier on which the bottom anchoring plate is mounted.

16. A method of manufacturing an impact-attenuation support member for an article of footwear, the method comprising:

forming a bottom anchor plate from an elastomeric polymer material;

forming on a surface of the bottom anchor plate a first plurality of connection points for coupling a first impact-attenuation element to the surface of the bottom anchor plate, the first plurality of connection points being radially arranged around a center reference axis;

forming on the surface of the bottom anchor plate at least one first connection point radially inward of the first plurality of connection points, the at least one first connection point for coupling a second impact-attenuation element to the surface of the bottom anchor plate;

forming a first portion the first impact-attenuation element and a first portion of the second impact-attenuation element, such that the first impact-attenuation element tapers from the first plurality of connection points to a radially smaller middle portion spaced apart from the surface of the bottom anchor plate and such that the second impact-attenuation element extends away from the surface of the anchor plate to a radially larger middle portion, which includes a radial segment that envelops the radially smaller middle portion of the first impact-attenuation element;

forming a second portion of the first impact-attenuation element and a second portion of the second impact-attenuation element, such that the first impact-attenuation element extends away from the radially smaller middle portion, away from the center reference axis, and flares from the radially smaller middle portion outward to a second plurality of connection points, and the second impact-attenuation element tapers toward at least one second connection point, which is radially inward of the second plurality of connection points; and forming a top anchor plate to which the second plurality of connection points of the first impact-attenuation element and the at least one second connection point of the second impact-attenuation element are coupled.

17. The method of claim 16, wherein forming the first plurality of connection points includes forming at least three connection points, and wherein forming the first portion of the first impact-attenuation element includes additively building a respective strut extending from each connection point of the at least three connection points, each strut connecting to the radially smaller middle portion.

18. The method of claim 17, wherein forming the second portion of the first impact-attenuation element includes additively building at least three struts extending from the radially smaller middle portion, each strut of the at least three struts terminating at a respective connection point of the second plurality of connection points.

19. The method of claim 18, wherein forming the first and second portions of the second impact-attenuation element includes additively building a wall with apertures, the wall extending from the at least one first connection point to the at least one second connection point, wherein each of the respective struts of the first impact-attenuation element extend through the apertures in the wall of the second impact-attenuation element.

20. The method of claim 19, wherein additively building the wall includes additively building an ellipsoid-shaped wall with the radial segment substantially aligned with a lateral axis of the ellipsoid-shaped wall.

* * * * *